Aug. 24, 1965     G. E. LEWIS     3,202,978

ELECTRICAL REMOTE CONTROL AND INDICATING SYSTEM

Filed Jan. 31, 1961

GEORGE E. LEWIS, INVENTOR.

BY Bartholew + Lewis

United States Patent Office
3,202,978
Patented Aug. 24, 1965

3,202,978
ELECTRICAL REMOTE CONTROL AND
INDICATING SYSTEM
George E. Lewis, Los Angeles, Calif., assignor to Hydril
Company, Los Angeles, Calif., a corporation of Ohio
Filed Jan. 31, 1961, Ser. No. 86,137
15 Claims. (Cl. 340—286)

This invention has to do generally with improved control mechanism for electrically actuable devices.

The invention is particularly useful for control of such devices requiring maximum reliability in their operation, as is generally true of a wide variety of emergency devices, for example. Ilustrative of such emergency apparatus is a blowout preventer or other shut-off device for an oil well. Especially for control of such apparatus, it is highly desirable to provide the operator with continuous visual indication that all electrical components of the control system are in proper operating condition.

At the same time, it is desirable for maximum reliability, as well as for other reasons, that the control system be as simple as possible. Particularly for remote control of an electrically actuable device, it is desirable to employ a minimum number of electrical connections between control and apparatus stations.

An excellent control system having the described characteristics is described and claimed in my Patent 2,872,940, issued February 10, 1959, under the title "Electrical Control and Indicating System," and assigned to the same assignee as the present application. The system therein described has been widely used for control of blowout preventers during well drilling operations and has proved highly satisfactory for the purposes intended. However, that system has been found to have limitations of function which may be disadvantageous under certain conditions.

A primary object of the present invention is to overcome such limitations of the previous system without sacrifice of its outstanding simplicity and reliability.

Whereas the prior system controlled only actuation of the blowout preventer, requiring manual return of the preventer to standby condition, the present system is capable of controlling both actuation and release of a blowout preventer or other device. The system provides direct indication of the condition of the device, whether in intermediate position or in either of its end positions, and also provides positive indication that the electrcal system is ready to shift the device toward one or either of its end positions. In addition, during operation of the device, the progress of its action is conveyed to the operator by means of a distinct pattern of differential energization of the indicator means. Yet those multiple indicating functions and the control function itself are all accomplished with only one live connection for each end position of the controlled device.

The present invention further frees the operator from holding the control button depressed throughout the period of operation of the electrical or other actuating mechanism. That is accomplished without sacrifice of indicating functions. Full reliability of operation is insured by novel circuit features to be described.

A further feature of the present invention permits convenient differential adjustment of the degree of energization of the indicator, typically a pilot light, whereby its several functions can be more reliably distinguished.

A still further feature of the invention enables the operator to distinguish between a negative indication that is due to some failure of the actuating system and one that is due merely to failure of the indicator itself.

A full understanding of the invention, and of its further objects and advantages will be had from the following description of certain illustrative manners in which it may be carried out. The particulars of that description, and of the accompanying drawings which are a part of it, are intended only as illustration of the invention and not as a limitation upon its scope, which is defined in the appended claims.

Figure 1:
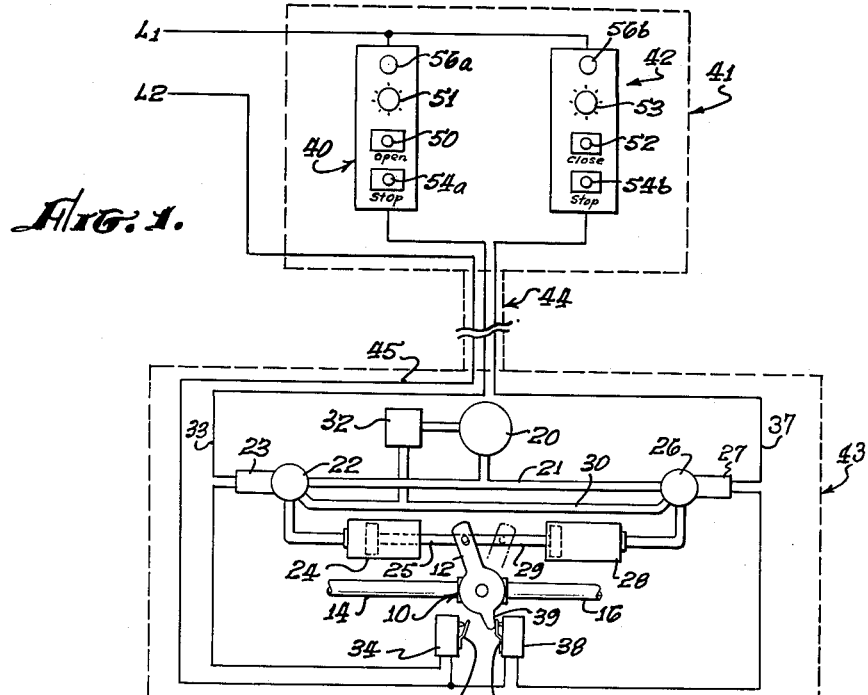
FIG. 1 is a schematic diagram representing an illustrative embodiment of the invention as typically employed for controllably shifting a valve, or the like, between two conditions.

In FIG. 1 an electrically actuable device is represented at 10 in the illustrative form of a rotary valve having an actuating arm 12 and controlling fluid flow between the conduits 14 and 16. Valve 10 is shiftable between two alternative positions, one of which will be referred to as normal position and is represented in solid lines. The other position, represented in dashed lines, will be referred to as the operated position of the valve. It will be assumed for clarity of description that valve 10 is closed in normal position and open in operated position. In an actual system, however, those positions may be reversed, or the valve may control more than one circuit. For control of a blowout preventer, valve 10 is typically a four-way valve, as is described more fully in the above identified patent.

The device 10 may, if desired, be directly driven between its two positions by electrical power, but is shown illustratively with hydraulic drive means controlled electrically. A source of pressurized hydraulic fluid is represented at 20, from which pressure is supplied selectively via the pressure line 21 and under control of the pilot valves 22 and 26 to the two hydraulic actuators 24 and 28. The actuators typically comprise cylinders containing pistons, not explicitly shown, which are linked by the respective piston rods 25 and 29 to valve actuating arm 12. Control valves 22 and 26 are typically solenoid valves of conventional type, with solenoid windings 23 and 27, respectively. Each valve opens upon electrical energization of its winding to supply pressure to the associated actuator. In released condition of each valve, pressure is permitted to escape from the actuator to the return line 30, from which the fluid may be returned to pressure source 20 by the pump indicated schematically at 32. Pressure in actuator 24 drives device 10 from normal to operated position, opening the valve in the present instance. Pressure in actuator 28 performs the opposite function of driving the device from operated to normal position, closing the valve in the present instance.

Actuating current is supplied from alternating current power lines L1 and L2 to control valve solenoids 23 and 27 via respective actuating circuits which include in series the lines 33 and 37, the control units 40 and 42, and the limit switches 34 and 38, respectively. Typical structure of units 40 and 42 will be described below in connection with FIGS. 2, 2A and 3. Limit switches 34 and 38 are operated in any desired manner which causes the associated actuating circuit to be opened in response to completion of the operation controlled by that circuit. In the present instance, each switch is spring-urged toward closed position, and is opened by depression of the actuating levers 36a and 36b. A cam formation 39 on valve 10 is arranged to open switch 38 when the valve is in normal position (solid lines) and to open switch 34 when the valve is in operated position (dashed lines).

Control units 40 and 42 are typically arranged at a remote location from the electrically actuated device they control, thus constituting a control station 41. That fact is indicated in FIG. 1 by schematic representation of a cable structure 44 between the control station and apparatus station 43. That cable need contain only one live wire for each of the controlled operations. If both sides of power source L1, L2 are available only at one of the locations, one of those lines is also carried as a common wire to the other location, typically within cable 44, as indicated for line L2 at 45. When the same power source connections are already available at both locations, line 45 may be omitted from the cable.

Each of the control units 40 and 42 typically comprises a manually actuable operating button, indicated in FIG. 1 at 50 and 52, respectively, and a spring-returned emergency stop button, indicated at 54a and 54b. The control unit also includes a main indicator, typically a lamp, shown at 51 and 53 for the respective units, and a check indicator, shown at 56a and 56b. When device 10 is in normal position, as shown, depression of spring-returned button 50 of control unit 40 energizes solenoid 23, causing the device to be driven to operated position. Also, when the device is in operated position, it may be returned to normal position by depressing spring-returned button 52 of control unit 42. In FIG. 1, button 50 is marked "open" and button 52 is marked "close," the legend in each instance denoting the position to which valve 10 is moved by actuation of the button. In normal standby condition of the system, one or other of the indicators 51 and 53 is energized. That tells the operator two primary kinds of information. First, it indicates that the valve is in the position from which it can be moved by actuation of the button associated with the energized indicator. Second, energization of the indicator shows that the electrical apparatus associated with that button is in proper operating condition. Additional information conveyed by indicators 51 and 53, as well as by the two check indicators 56a and 56b, will be explained below. Control units 40 and 42 are shown as separate panels or cabinets in FIG. 1 for clarity of description, but may be integrated physically if desired. Particularly in that case, one common stop button may be used in place of the two separate buttons 54a and 54b shown in FIG. 1.

Figures 2, 2A:
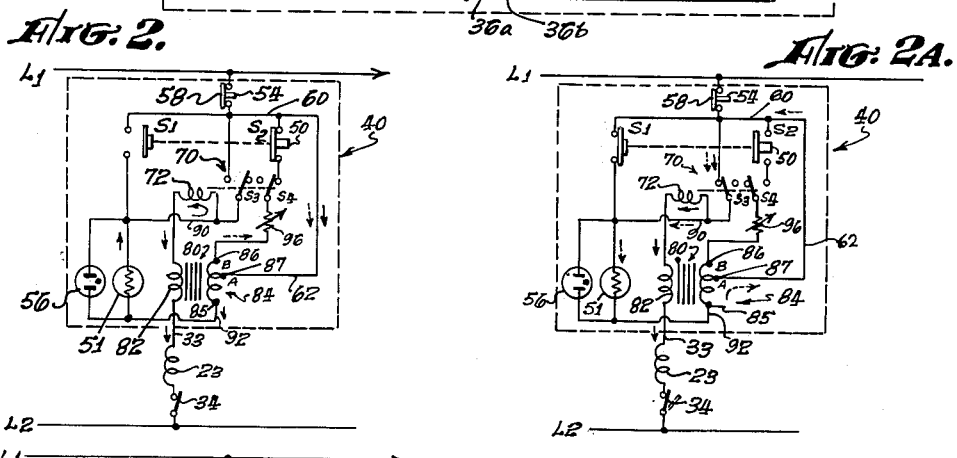
FIG. 2 is a schematic diagram representing an illustrative control circuit in accordance with the invention in normal condition.
FIG. 2A is a schematic diagram corresponding to FIG. 2, but showing the circuit in operating condition.

FIG. 2 represents illustrative circuitry for control unit 40 in accordance with certain aspects of the invention. Unit 42 may comprise identical circuitry, and does not require separate description and illustration. Stop button 54 is associated with the normally closed switch 58, connected in series between the power line L1 and the line 60. The latter line is therefore energized unless button 54 is depressed, as to stop the controlled device at an intermediate position, or for emergency reasons. Manual operating button 50 is associated with a normally open switch S1 and a normally closed switch S2 (FIG. 2). Depression of the button closes S1 and opens S2, as shown in FIG. 2A. Whereas those switches are shown and will be described as two distinct switches, they may employ a single switch arm, and thus comprise a unitary double throw switch structure. Output line 33 from device 40 is shown in FIG. 2, but without explicit representation of cable 44 of FIG. 1. Solenoid winding 23 and limit switch 34 are series connected between that line and power line L2, as in FIG. 1.

A relay device is represented generally at 70, comprising the actuating winding 72 and the two relay switches S3 and S4. Switch S3 is normally open, and switch S4 is normally closed, as shown in FIG. 2; and they are shifted to opposite condition as shown in FIG. 2A upon energization of winding 72 by a current of magnitude exceeding a critical threshold value. The relay is preferably so designed or selected that its normal actuating current is approximately equal to the normal actuating current of coil 23 of solenoid valve 22 (FIG. 1).

A transformer is represented schematically at 80, with primary winding 82 and secondary winding 84. Winding 84 has end terminals 85 and 86, and is tapped at 87 adjacent end terminal 86, dividing the secondary into sections A and B. The transformer core is of a type which provides relatively large leakage reactance, and is designed to saturate magnetically with a primary current well below the normal actuating inrush current of relay 70 and solenoid 23, and only slightly greater than their normal holding current. The transformer is so wound that during the half-cycle that current flows down in primary 82, as drawn, the induced current in secondary 84 flows upward.

As shown in FIGS. 2 and 2A, line 60, which is normally equivalent to power line L1, is connected to the line 90 via the two parallel-connected, normally open switches S1 and S3. Relay winding 72 is connected in series with transformer primary winding 82 between line 90 and output line 33. Line 60 is also connected via the line 62 to transformer secondary 84, typically at tap 87, and secondary terminal 85 is connected to line 90 via the line 92 and the two indicators 51 and 56 in parallel, forming an indicator circuit that is connected in shunt to the normally open switches S1 and S3. The variable impedance element 96, shown typically as a variable resistance, is connected in series with normally closed manual switch S2 and relay switch S4 between line 60 and transformer secondary 84, typically at its end terminal 86. With suitable design of the transformer, the described connections at secondary terminals 86 and 87 can be interchanged, if desired. Indicators 51 and 56 preferably have relatively high impedance, typically comprising, respectively, a small incandescent lamp and a neon glow lamp, for example.

In standby condition of the described circuit, as in FIG. 2, limit switch 34 is closed, due to presence of device 10 in normal condition. Indicator lamp 51 is then energized by current in the test circuit indicated by the solid arrows in FIG. 2. That circuit extends from power line L1 through closed stop switch 58, lines 60 and 62, section A of transformer secondary 84, lamp 51, line 90, relay winding 72, transformer primary 82, line 33, actuating winding 23 of the device to be operated and closed limit switch 34 to power line L2. Presence in that circuit of the relatively high impedance of the indicator lamps prevents flow of enough current to actuate either relay 70 or solenoid coil 23. Moreover, that circuit also contains the primary and at least most of the secondary of transformer 80, connected in series in additive phase, as indicated by the solid arrows, tending to produce a high impedance. The transformer is preferably so designed as to make that impedance so high that if it were fully included in the described circuit, indicator lamp 51 would not be energized, or would glow only dimly. That high impedance is then reduced by loading the part-winding B of the secondary by an auxiliary loading circuit. The current induced in that circuit is in opposite phase to the primary current, as indicated by the dashed arrows in FIG. 2.

In accordance with one aspect of the present invention, the impedance of that loading circuit is made continuously variable, so that the current induced therein may be varied correspondingly. The loading circuit in the present system includes winding section B, variable impedance 96, normally closed switches S2 and S4 and line 62. Adjustment of impedance 96 varies the loading current, and indirectly provides continuous variation of the effective transformer impedance in the described test circuit through lamp 51. In that way, the precise desired lamp brightness can be obtained for representing normal standby condition of the circuit without affecting the other functions of the lamp, to be described.

In the described standby condition, normal appearance of lamp 51 tells the operator that the test circuit is complete, and hence that relay winding 72, line 33, actuator winding 23 and limit switch 34 are all intact and ready for operation. Opening of any part of the described test or loading circuits would cause the lamp to dim or go out; while short circuiting of winding turns or connecting wires would reduce the impedance of one or both circuits and so cause the indicator light to brighten. Therefore, in the circuit ready condition, normal illumination of the indicator light continuously tests all the operating equipment and wiring, insuring their being in operating condition at all times.

The check indicator 56 is of any suitable type having an impedance that is high compared to that of indicator 51, and requiring an energizing voltage that is large compared to the voltage drop appearing across indicator 51 during energization of the latter. Thus if indicator 51 is an incandescent lamp of a few watts, for example, check indicator 56 may typically comprise a neon glow lamp that requires substantially the whole voltage between power lines L1 and L2 for energization, and that draws only about 0.5 watt when energized. Lamp 51 then normally prevents the check lamp from lighting, acting as a low resistance shunt. However, if an open circuit should occur in indicator 51, for example by burning out of its incandescent filament, check indicator 56 is energized, positively informing the operator of the trouble.

If control button 50 is now depressed momentarily, the described transformer loading circuit is opened at switch S2; and an operating circuit is completed by closure of S1. That operating circuit leads from power line L1 through stop switch 58, line 60, closed manual switch S1, line 90, relay winding 72, transformer primary winding 82 and via line 33, actuating coil 23 and limit switch 34 to power line L2. That operating circuit contains no effectively high impedance, since the transformer is designed for high primary current, and preferably saturates at relatively low load, as already described. The line voltage is therefore virtually divided between the relay and actuator windings, actuating both.

Actuation of relay 70 provides a holding circuit via S3 for the actuating current, and also maintains open condition of the described loading circuit at S4. Hence manual control button 50 can now be released without interrupting completion of the operation. Energization of winding 23 initiates operation of device 10 (FIG. 1), in the present instance by operation of pilot valve 22 to supply hydraulic pressure to actuator 24 and thereby initiate drive of valve 10 to open (dashed line) position. That drive may be substantially instantaneous, as in the case of a small valve or similar structure; but will typically require an appreciable drive period if device 10 represents a relatively large or complex structure. Such structure may involve several successive operational steps, the last of which must be completed before limit switch 34 is opened. That drive action, whatever its normal duration( can be interrupted at any desired moment by depressing stop button 54 and deenergizing solenoid winding 23 and relay winding 72.

The energizing current through winding 23 flows also through transformer primary 82 and induces a voltage in the secondary winding 84. That voltage causes a current to flow in section A of the secondary in opposite phase to the primary current, as indicated by the dashed arrows in FIG. 2A. That current flows through indicator lamp 51 via the indicating circuit that extends from winding tap 87 via line 62, switches S1 and S3 in parallel, lamp 51, and line 92 to the other side of the secondary winding at terminal 85. Upper section B of secondary winding 84 is open at switch S4.

Electromagnetic devices such as relay 70 and pilot valve 22 typically have two distinct impedances to alternating current. In released condition of the device the relatively large air gap provides low impedance and permits momentary flow of a large inrush or actuating current for a given applied voltage. In actuated condition of the device the airgap is reduced or eliminated. The resulting increased impedance limits the current to a relatively low value, which is adequate, however, to hold the device in operated condition. In the present system that difference between inrush and holding currents is reflected in the induced current through indicator lamp 51, giving clear indication to the operator of the state of the apparatus.

It is found in practice that the differential energization of lamp 51 required for clear distinction of inrush from holding currents is less than the actual current difference. For given ratio of currents in the transformer primary, the desired voltage ratio in the secondary is obtained by designing the transformer to substantially saturate at a selected current value intermediate the inrush and holding currents. For typical inrush and holding current values of approximately 18 and 2.2 amperes, respectively, the transformer is preferably designed to saturate at a current slightly above the holding value. The lamp voltage may thereby be limited to approximately normal rated voltage during inrush, and yet be made equal to about 60% of rated voltage, for example, during holding. Such values provide clear visual differentiation between the two conditions, and yet prevent overloading of the lamp even during the normally brief inrush period. The described transformer saturation also reduces the effective impedance in the actuating circuit during current inrush.

With indicator energization of the described illustrative degrees for inrush and holding stages of the operating cycle, the variable impedance 96 can readily be arranged to provide standby energization of the indicator that is intermediate in degree, for example about 80% of rated voltage. That standby energization is then low enough to give long lamp life and to permit ready identification of both abnormally high and low values, due to such circuit faults as have been described. It also yields a convenient indicator pattern during normal operation, namely, intermediate lamp brightness during standby, greater brightness during current inrush, and lower brightness following actuation of pilot valve 22 and until completion of the resulting drive of device 10. Completion of that drive is finally indicated by extinction of the indicator due to opening of limit switch 34.

The rather large difference between inrush and holding currents that is typical of electromagnetic devices powered by alternating current facilitates the above described multiple action of indicator 51. When two such electromagnetic devices are connected in series, as in the present circuit, they are preferably selected, in accordance with a further feature of the invention, to have substantially equal normal actuating times when operated under the power conditions of the described circuit. The possibility is thereby minimized that actuation of one device will so reduce the current as to prevent actuation of the other device.

Figure 3:
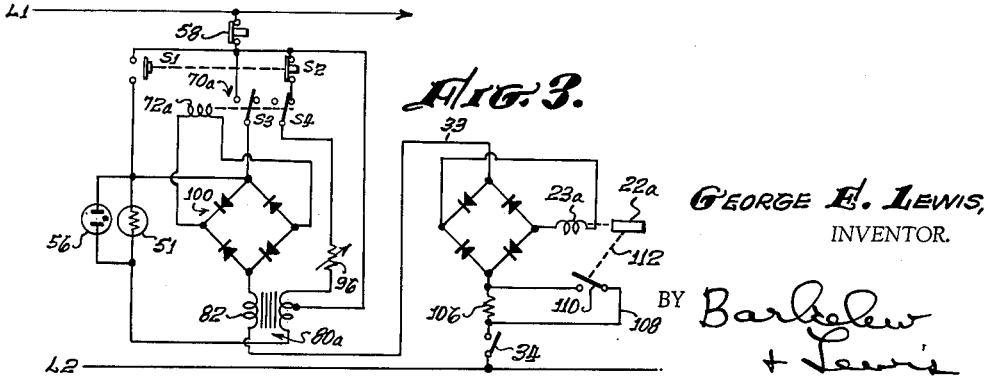
FIG. 3 is a schematic diagram representing a modification.

A further aspect of the invention, illustrates in FIG. 3, avoids any possibility of malfunction from the cause just described. In the modified system of FIG. 3, both the relay and the electrical actuator for the output device are powered by direct current. The impedance then does not change value upon actuation. Relay winding 72a is powered by the rectifier 100, shown illustratively as a conventional fullwave rectifying bridge, which is connected in series with switch S3 and transformer primary 82 at the control station. Actuator winding 23a is powered by the second rectifier 102, which is connected in series with line 33 and limit switch 34 at the apparatus station. With that arrangement, the current is determined essentially by the combined resistance of the windings 72a and 23a, which is indepdent of their magnetic gap. The current is then uniform whether the magnetic device is actuated or not.

The multiple indicating function of indicator 51, described in connection with FIG. 2 and 2A, is retained in the system of FIG. 3 by inserting in the actuating circuit an impedance 106 which is effectively removed by closure of shunting circuit 108 by the switch 110. That switch is controlled by actuation of device 22a, as indicated schematically by the dashed line 112. The change of current produced by switch 112 upon actuation of device 22a may be either an increase or a decrease, by suitable selection of linkage 112. A current decrease upon actuation is preferred. That current change may be relatively small, for example 10 to 40%, in contrast to the typical change of several hundred percent caused by actuation of an alternating current device. That relatively small current change upon actuation of device 22a does not appreciably affect actuation of relay 70a. Transformer 80a is preferably substantially linear at both current values, so that the full current change is reflected at indicator 51.

It will be recognized that in normal standby condition of one control unit, as described typically for unit 40 in connection with FIG. 2, the indicator of the other control unit is deenergized due to its open limit switch, which is switch 38 of FIG. 1 in the present instance. When operation of the controlled device is initiated, say by pressing the control button 50 of standby unit 40, the behavior of the associated indicator 51 and its significance have already been described. Additionally, the indicator 53 of the other unit 42 becomes energized as soon as the device is moved sufficiently from its initial end position to permit closure of limit switch 38. That indicator energization is of the type already described as standby, and tells the operator both that the controlled device has left its initial end position and that all electrical components of the control system are in operating readiness to return it to that position by depression of control button 52.

The control device may be stopped at a position intermediate its two end positions by momentarily depressing stop button 54 of the operating control unit. That opens the operating circuit, releasing the relay and typically returning the control system to standby condition. If the intermediate position is such that both limit switches 34 and 38 are closed, both control units then remain in standby condition, the normal energization of both indicators clearly indicating to the operator that both units are ready for operation, and that the device 10 is in an intermediate position.

If more detailed information regarding such intermediate positions of the control device should be desired, an additional remote indicating system or systems may be provided. Such a system, which may comprise a conventional selsyn indicating system, for example, typically requires additional leads between control and apparatus stations. However, whenever maximum reliability is required, it is still highly advantageous to retain also the described indicating functions of the present two-way system, which require only one live connection for each direction of drive.

Control units 40 and 42 are shown in FIG. 1 as two physically dintinct units for clarity of description, but may be consolidated in a single cabinet if desired. Two separate stop bottons 54a and 54b may be provided, with separate switches for powering the two control units from power line L1; for a single stop switch may supply power to line 60 of both control units. In the latter instance, depression of the stop button stops drive of device 10 in either diretcion. Stop switch 58 and control switches S1 and S2, described as conventional spring-returned manual switch structures, may be replaced by and desired type of switching mechanism. Device 10 might well be an electric motor in which case solenoid coils 23 and 27 as herein described, may be the magnetic coils of a reversing type motor starter, or relays for the control of other electric circuits. These particular devices are but a few of a family of similar devices which could be remotely controlled using the system as described and claimed herein. Many other modifications may be made in the described control systems without departing from the proper scope of the invention, the specific embodiments and modifications that have been described being intended only for illustration.

I claim:

1. Control means adapted to be connected in a circuit between a source of electrical power and an electrically actuable device that includes a limit switch for opening said circuit in response to completion of such actuation; said control means comprising in combination a main switch, circuit means for connecting the switch in series with the device for actuation thereof in response to switch closure, a shunt circuit connected across the switch to be energized when the switch is open, indicator means energized by current in the shunt circuit, a transformer having coil means including a first coil connected in series with the switch and a second coil connected in series with the indicator means to energize the same when the switch is closed, and relay means comprising an actuating winding connected in series with the main switch and with said device, a normally open relay switch connected in shunt to the main switch to act as holding circuit for actuation of the device in actuated condition of the relay, and a normally closed relay switch connected in shunt to a portion of said coil means to modify the effective impedance in series with the indicator means in idle condition of the relay means.

2. Control means adapted to be connected in a circuit between a source of electrical power and an electrically actuable device that includes a limit switch for opening said circuit in response to completion of such actuation; said control means comprising in combination a main switch, relay means comprising an actuating winding, a normally open relay switch connected in shunt to the main switch, and a normally closed relay switch, a transformer having a primary winding and a secondary winding, first circuit means for series connecting the main switch, the relay winding and the primary winding in said circuit for actuation of said device in response to switch closure, indicator means, second circuit means for series connecting the indicator means and at least a portion of the secondary winding in shunt to the main switch for energization when the main switch is open, the indicator means being energized by transformer action when the main switch is closed, and third circuit means connecting the normally closed relay switch in shunt to a portion of the secondary winding.

3. Control means as defined in claim 2 and including also variable impedance means connected in series with said third circuit means for adjustably varying the effective impedance of said second circuit means.

4. Control means as defined in claim 2 and including also a second switch connected in series with said third circuit means, and means acting to close the second switch only when the main switch is open.

5. Control means adapted to be connected in a circuit between a source of alternating current power and an electromagnetic device for controlling actuation of the same, said device being actuable within a predetermined normal actuating time in response to a definite actuating current and including a limit switch for opening said circuit in response to completion of such actuation, said control means comprising in combination a main switch, relay means comprising an actuating winding, a normally open relay switch connected in shunt to the main switch, and a normally closed relay switch, the relay means being actuable in response to said actuating current within a normal actuating time substantailly equal to the normal actuating time of said device, a transformer having a primary winding and a secondary winding, first circuit means for series connecting the main switch, the relay winding and the primary winding in said circuit for actuation of said device in response to switch closure, indicator means, second circuit means for series connecting the indicator means and at least a portion of the secondary winding in shunt to the main switch for energization when the main switch is open, the indicator means being energized by transformer action when the main switch is closed, and third circuit means connecting the normally closed relay switch in shunt to a portion of the secondary winding to modify the effective impedance in series with the indicator means in idle condition of the relay means.

6. In a control system for an electromagnetic device, the combination of a source of alternating current power, a main switch, electromagnetic relay means actuable to close a holding circuit in shunt to the main switch, first and second rectifying means, a transformer having primary and secondary coils, circuit means connecting the main switch, both rectifying means and the primary coil in series with the power source, indicator means, circuit means interconnecting the secondary winding and the indicator means for energizing the latter, circuit means for supplying direct current power from one rectifying means to the relay means to actuate the same in response to switch closure, and circuit means for supplying direct current power from the other rectifying means to the electromagnetic device to actuate the same in response to switch closure or relay actuation, whereby the device and the relay are both reliably actuated in response to flow of alternating current power in a single actuating circuit independently of the time sequence of such individual actuations.

7. The combination defined in claim 6 and including also circuit means connecting the indicator means in shunt to the main switch for energization when the main switch and the holding circuit are open.

8. The combination defined in claim 7 and including also circuit means connected in shunt to a portion of a transformer coil and including in series a switch that is closed only when the main switch is open, and a switch that is closed only when the relay means is deactuated.

9. The combination defined in claim 7 and including also circuit means connected in shunt to a portion of a transformer coil and including in series variable impedance means, a switch that is closed only when the main switch is open, and a switch that is closed only when the relay means is deactuated.

10. The combination defined in claim 6, and including also means for opening the first said circuit means in response to actuation of the electromagnetic device.

11. Control means adapted to be connected in a circuit between a source of electrical power and an electrically actuable device; said control means comprising in combination a main switch, circuit means for connecting the switch in said circuit for actuation of the device in response to switch closure, a shunt circuit connected across the switch to be energized when the switch is open, indicator means energized by current in the shunt circuit, transformer means for energizing the indicator means when the switch is closed, variable impedance means, circuit means connecting said impedance means in a control circuit for adjustably varying the indicator energization when the main switch is open, and means responsive to closure of the main switch for disabling said variable impedance means to render the indicator energization independent of said impedance means when the main switch is closed.

12. Control means adapted to be connected in a circuit between a source of electrical power and an electrically actuable device; said control means comprising in combination a main switch, circuit means for connecting the switch in said circuit for actuation of the device by current of operating magnitude in response to switch closure, a transformer having primary coil means connected in series with the switch and having secondary coil means and loading coil means, indicator means actuable by current of less than said operating magnitude, shunt circuit means including in series the indicator means and the secondary coil means and connected in shunt to the switch for energization of the indicator means by current of less than operating magnitude flowing in series through said shunt circuit and through the primary coil means and said device when the switch is open, the indicator means being energized by transformer action when the switch is closed, variable impedance means connected in series with the loading coil means to form a loading circuit for adjustably varying the effective impedance in said shunt circuit, and switch means for opening the loading circuit when the main switch is closed.

13. Control means as defined in claim 12, and wherein said indicator means energization, when the main switch is closed, is via a secondary circuit that includes in series the secondary coil means, the indicator means and the main switch, said variable impedance means being isolated from that secondary circuit.

14. Control means adapted to be connected in a circuit between a source of electrical power and an electrically actuable device; said control means comprising in combination a main switch, circuit means for connecting the switch in said circuit in series with the device for actuation thereof by current of operating magnitude in response to switch closure, a shunt circuit connected across the switch to be energized when the switch is open, first indicator means connected in series in the shunt circuit and having a normal energizing current less than said operating magnitude and a normal voltage drop when so energized, a transformer having coil means including a first coil connected in series with the switch and a second coil connected in series with the indicator means to energize the same when the switch is closed, and second indicator means connected in shunt to the first indicator means, the second indicator means requiring an energizing voltage that is high compared to said normal voltage drop and requiring an energizing current that is low compared to said normal energizing current of the first indicator means, whereby, when the switch is open, closed circuit condition of said device is normally indicated by energization of the first indicator means and is indicated by energization of the second indicator means under open circuit condition of the first indicator means.

15. Control means adapted to be connected in a circuit between a source of electrical power and an electrically actuable device; said control means comprising in combination a main switch, circuit means for connecting the switch in said circuit for actuation of the device in response to switch closure, indicator means, transformer means including primary winding means energizable in response to current in said circuit and secondary winding means connected to energize the indicator means when the switch is closed, circuit means forming a shunt circuit that includes in series said primary and secondary winding means and the indicator means, said shunt circuit being connected across the switch to be energized when the switch is open, and means for adjustably varying the effective impedance of the transformer winding means in said shunt circuit when the switch is open to modify the indicator energization when the switch is open independently of the indicator energization when the switch is closed.

References Cited by the Examiner

UNITED STATES PATENTS

| | | | |
|---|---|---|---|
| 2,157,777 | 5/39 | Stoffell | 340—250 |
| 2,347,523 | 4/44 | Suksdorf | 340—226 X |
| 2,354,888 | 8/44 | Smith | 340—226 X |
| 2,432,899 | 12/47 | Immel | 317—154 |
| 2,759,130 | 8/56 | Brewer | 317—154 X |
| 2,872,940 | 2/59 | Lewis | 137—554 |
| 2,882,521 | 4/59 | Salzer et al. | 340—250 |
| 3,099,828 | 7/63 | Kelley | 340—248 |

NEIL C. READ, *Primary Examiner*.

BENNETT G. MILLER, *Examiner*.